US011039416B2

(12) United States Patent
Li et al.

(10) Patent No.: US 11,039,416 B2
(45) Date of Patent: Jun. 15, 2021

(54) PAGING METHOD AND APPARATUS UTILIZING PDCCH

(71) Applicant: Huawei Technologies Co., Ltd., Shenzhen (CN)

(72) Inventors: Sainan Li, Chengdu (CN); Huang Huang, Shenzhen (CN); Xi Zhang, Chengdu (CN); Yalin Liu, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/504,104

(22) Filed: Jul. 5, 2019

(65) Prior Publication Data
US 2019/0327709 A1 Oct. 24, 2019

Related U.S. Application Data

(63) Continuation of application No. PCT/CN2018/071640, filed on Jan. 5, 2018.

(30) Foreign Application Priority Data

Jan. 6, 2017 (CN) .......................... 201710010620.7
Feb. 10, 2017 (CN) .......................... 201710074201.X

(51) Int. Cl.
*H04W 4/00* (2018.01)
*H04W 68/00* (2009.01)
(Continued)

(52) U.S. Cl.
CPC .......... *H04W 68/005* (2013.01); *H04W 16/28* (2013.01); *H04W 68/02* (2013.01);
(Continued)

(58) Field of Classification Search
CPC ... H04W 68/005; H04W 76/11; H04W 16/28; H04W 68/02; H04W 72/046; H04W 72/042
See application file for complete search history.

(56) References Cited

U.S. PATENT DOCUMENTS

2012/0281566 A1 11/2012 Pelletier et al.
2013/0203450 A1* 8/2013 Mochizuki ............ H04W 68/02
455/458
(Continued)

FOREIGN PATENT DOCUMENTS

CN 1725869 A 1/2006
CN 101868029 A 10/2010
(Continued)

OTHER PUBLICATIONS

Huawei et al., "Offline summary for AI 7.1.3 on Paging for NR," Agenda Item: 7.1.3, R1-1718771, 3GPP TSG RAN WG2 Meeting 90bis, Prague, Czech Republic, Oct. 9-13, 2019, 6 pages.
(Continued)

*Primary Examiner* — Abdelnabi O Musa
(74) *Attorney, Agent, or Firm* — Slater Matsil, LLP

(57) ABSTRACT

Embodiments of this application provide a paging method, including: sending, by a network device, paging-related information at a specified time, where the paging-related information is sent in a beam sweeping manner. A paging message is obtained based on the paging-related information.

15 Claims, 5 Drawing Sheets

(51) Int. Cl.
*H04W 76/11* (2018.01)
*H04W 16/28* (2009.01)
*H04W 68/02* (2009.01)
*H04W 72/04* (2009.01)

(52) U.S. Cl.
CPC ....... *H04W 72/042* (2013.01); *H04W 72/046* (2013.01); *H04W 76/11* (2018.02)

(56) References Cited

U.S. PATENT DOCUMENTS

| | | | |
|---|---|---|---|
| 2014/0128109 A1* | 5/2014 | Li | H04W 68/02 455/458 |
| 2014/0254515 A1 | 9/2014 | Kim et al. | |
| 2015/0181575 A1* | 6/2015 | Ng | H04W 72/042 370/329 |
| 2015/0201368 A1 | 7/2015 | Cudak et al. | |
| 2017/0339665 A1 | 11/2017 | Agiwal et al. | |
| 2018/0027522 A1* | 1/2018 | Lee | H04W 72/0413 370/336 |

FOREIGN PATENT DOCUMENTS

| | | |
|---|---|---|
| CN | 103460788 A | 12/2013 |
| CN | 104604300 A | 5/2015 |
| CN | 105027524 A | 11/2015 |
| CN | 105812035 A | 7/2016 |
| CN | 105898867 A | 8/2016 |
| CN | 106170930 A | 11/2016 |
| EP | 2915390 A1 | 9/2015 |
| WO | 2014069970 A1 | 5/2014 |
| WO | 2014139174 A1 | 9/2014 |

OTHER PUBLICATIONS

ZTE, ZTE Microelectronics, "Considerations on Paging Transmission," Agenda item: 7.1.2.7, 3GPP TSG RAN WG1 Meeting #87; R1-1611277, Reno USA, Nov. 14-18, 2016, XP051175258, 6 pages.

Samsung, "NR paging channel design," R1-1612458, 3GPP TSG RAN WG1 Meeting #87, Reno, USA, Nov. 14-18, 2016, 4 pages.

* cited by examiner ated with one another according to a signal (for example, data from two components, where one component interacts with another component in a local system, a distributed system, and/or a network such as the Internet interacting with another system by using the signal).

PAGING METHOD AND APPARATUS UTILIZING PDCCH

CROSS-REFERENCE TO RELATED APPLICATIONS

This application is a continuation of International Application No. PCT/CN2018/071640, filed on Jan. 5, 2018, which claims priority to Chinese Patent Application No. 201710010620.7, filed on Jan. 6, 2017 and Chinese Patent Application No. 201710074201.X, filed on Feb. 10, 2017; the disclosures of the aforementioned applications are hereby incorporated by reference in their entireties.

TECHNICAL FIELD

This application relates to the communications field, and more specifically, to a paging method and an apparatus.

BACKGROUND

To meet a large-capacity requirement of a next-generation communications system, a high frequency band of greater than 6 GHz is introduced for communication, to use high-bandwidth and high-rate transmission. This is one of popular research technologies of a 5G communications system. Due to a high path loss of high-frequency communication, a narrow beam needs to be used to ensure a transmission distance and a high beam gain. However, a coverage area of the narrow beam is limited. To ensure communication quality, narrow-beam alignment needs to be performed between a BS (base station) and UE (user equipment). This brings a challenge to designing of a broadcast channel, a control channel, a synchronization channel, and a random access channel. In an existing cellular communications system, the foregoing channels are implemented through sending/receiving performed by an omnidirectional antenna. If an effect of omnidirectional coverage in an existing mobile communications system needs to be achieved, all directional-beam combinations of a transmit end and a receive end need to be traversed. If both the transmit end and the receive end use directional beams, there are a huge quantity of beam combinations, causing a sharp increase in overheads of a high-frequency system.

In addition, in NR (new radio) technology research, there is still no better paging mechanism.

SUMMARY

This application provides a paging method and an apparatus.

According to a first aspect, a paging method is provided, and includes: sending, by a network device, paging-related information at a specified time, where the paging-related information is sent in a beam sweeping manner.

According to a second aspect, a paging method is provided, and includes: receiving, by a user equipment, paging-related information; and obtaining, by the user equipment, a paging message based on the paging-related information.

According to a third aspect, a network device is provided, and includes a processor and a transceiver. The transceiver is configured to send paging-related information at a specified time, where the paging-related information is sent in a beam sweeping manner.

According to a fourth aspect, user equipment is provided, and includes a processor and a transceiver. The transceiver is configured to receive paging-related information, and the transceiver is further configured to obtain a paging message based on the paging-related information.

According to a fifth aspect, a computer storage medium is provided. The computer storage medium stores program code, and the program code may be used to instruct to perform the method in the first aspect and the second aspect or any one of optional implementations of the first aspect and the second aspect

BRIEF DESCRIPTION OF THE DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may derive other drawings from these accompanying drawings without creative efforts.

DETAILED DESCRIPTION OF ILLUSTRATIVE EMBODIMENTS

Figure 1:
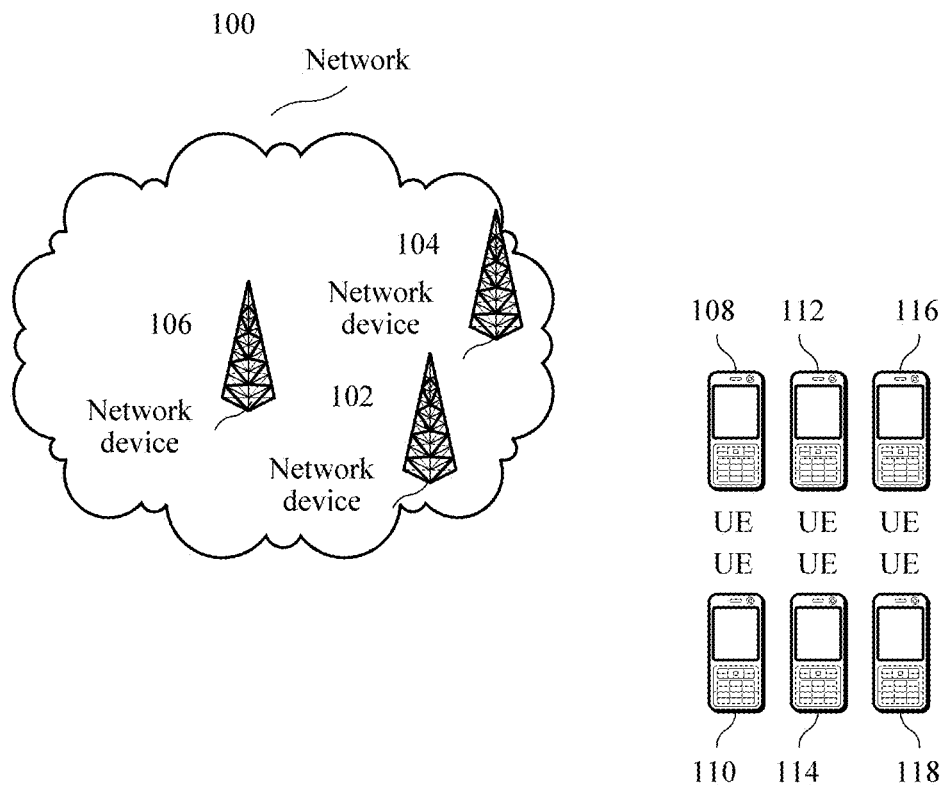
FIG. 1 is a diagram of an application scenario according to an embodiment of this application.

The following clearly describes the technical solutions in the embodiments of the present invention with reference to the accompanying drawings in the embodiments of the present invention. Apparently, the described embodiments are some rather than all of the embodiments of the present invention. All other embodiments obtained by a person of ordinary skill in the art based on the embodiments of the present invention without creative efforts shall fall within the protection scope of the present invention.

Terms such as "component", "module", and "system" used in this specification are used to represent computer-related entities, hardware, firmware, combinations of hardware and software, software, or software being executed. For example, the component may be but is not limited to a process that is run on a processor, a processor, an object, an executable file, a thread of execution, a program, and/or a computer. As shown in figures, both an application that is run on a computing device and the computing device may be components. One or more components may reside within a process and/or a thread of execution, and a component may be located on one computer and/or distributed between two or more computers. In addition, these components may be executed from various computer-readable media that store various data structures. For example, the components may communicate by using a local and/or remote process and based on a signal having one or more data packets (for example, data from two components interacting with another component in a local system, a distributed system, and/or across a network such as the Internet interacting with other systems by using the signal).

It should be understood that, the technical solutions in the embodiments of the present invention may be applied to various communications systems, such as a Global System for Mobile Communications ("GSM" for short) system, a Code Division Multiple Access ("CDMA" for short) system, a Wideband Code Division Multiple Access ("WCDMA" for short) system, a Long Term Evolution ("LTE" for short) system, an LTE frequency division duplex ("FDD" for short) system, an LTE time division duplex ("TDD" for short) system, a Universal Mobile Telecommunications System ("UMTS" for short), and a future 5G communications system.

The present invention describes the embodiments with reference to user equipment. The user equipment may alternatively be an access terminal, a subscriber unit, a subscriber station, a mobile station, a mobile console, a remote station, a remote terminal, a mobile device, a user terminal, a terminal, a wireless communications device, a user agent, or a user apparatus. The access terminal may be a cellular phone, a cordless phone, a Session Initiation Protocol ("SIP" for short) phone, a wireless local loop ("WLL" for short) station, a personal digital assistant ("PDA" for short), a handheld device having a wireless communication function, a computing device, another processing device connected to a wireless modem, an in-vehicle device, a wearable device, user equipment in a future 5G network, user equipment in a future evolved public land mobile network (PLMN), or the like.

The present invention describes the embodiments with reference to a network device. The network device may be a device configured to communicate with the user equipment. For example, the network device may be a base transceiver station (Base Transceiver Station, "BTS" for short) in a GSM or CDMA system, may be a NodeB (NodeB, "NB" for short) in a WCDMA system, or may be an evolved NodeB ("eNB" or "eNodeB" for short) in an LTE system. Alternatively, the network device may be a relay station, an access point, an in-vehicle device, a wearable device, a network-side device in a future 5G network, a network device in a future evolved PLMN, or the like.

In the embodiments of this application, "A and/or B" indicates three relationships: A, B, or A and B.

As shown in FIG. 1, the embodiments of the present invention are applicable to a communications network 100. There are a plurality of network devices 102, 104, and 106 and one or more user equipments 108, 110, 112, 114, 116, and 118 in the communications network.

In LTE, a network may send paging messages to UE that is in an idle mode and UE that is in a connected mode. In a discontinuous reception (DRX for short) period, a terminal may listen, only in a paging occasion (PO for short) of a corresponding paging frame (PF for short), whether a physical downlink control channel (PDCCH for short) in the PO carries a paging radio network temporary identifier (P-RNTI for short). Each UE can calculate own paging periodicity, and perform detection in a corresponding PO based on own paging periodicity. If a PDCCH in the PO carries a P-RNTI, the UE receives a paging message on the PDCCH in the PO based on a physical downlink shared channel (PDSCH for short) parameter indicated by the PDCCH. The paging message includes a paging record list (UE id), a system message update indication systemInfoModification, an ETWS (Earthquake and Tsunami Warning System), a CMAS (Commercial Mobile Alert System), eab-Param-Modification, redistributionIndication (inter-frequency redistribution), and the like. For details, refer to the 36.331 protocol in the 3GPP. If detecting a P-RNTI, all UEs that perform detection in one PO need to receive a paging message on a PDSCH. Only in this way, the UE can know whether there is a paging message for the UE.

In a high-frequency communication process, a narrow beam needs to be used to ensure a transmission distance and a high beam gain, and beam alignment needs to be performed to ensure communication quality. Therefore, a base station performs transmission with different user equipments on different beam pairs. Some signals that need to be broadcast in an entire cell, for example, a synchronization signal such as a PSS (primary synchronization signal) or an SSS (secondary synchronization signal), and system information such as a MIB (master information block), need to be sent in a beam traversal manner, to cover the entire cell. In a high-frequency system, when a network needs to page UE, if the UE is in an idle/inactive mode, there may be no high-frequency maintenance beam pair between a base station and the UE. When the base station needs to page the UE, the base station does not know a beam used to send a DCI control signal and a paging message in a PO to the UE. If the DCI control signal and the paging message are separately sent through beam traversal in an entire cell, system overheads are relatively large.

The following describes the embodiments of this application. Although terms that are the same as those in LTE may be used in the following embodiments, meanings of the terms and content included in the terms may be different from those in LTE, and the terms may alternatively be replaced with other terms that have same or similar meanings and that include same or similar content. In addition, although the embodiments include a plurality of network elements, it does not indicate that all the network elements should be included in the solutions protected by this application. For example, a paging occasion (PO for short) may have a same meaning as that in LTE, or may have a different meaning from that in LTE. For example, content included in a paging message may be the same as or may be different from that in LTE. For another example, a P-RNTI may be a fixed value, and may be the same as or different from that in LTE. The P-RNTI may be a fixed hexadecimal number FFFE, or may be another value.

Figure 2:
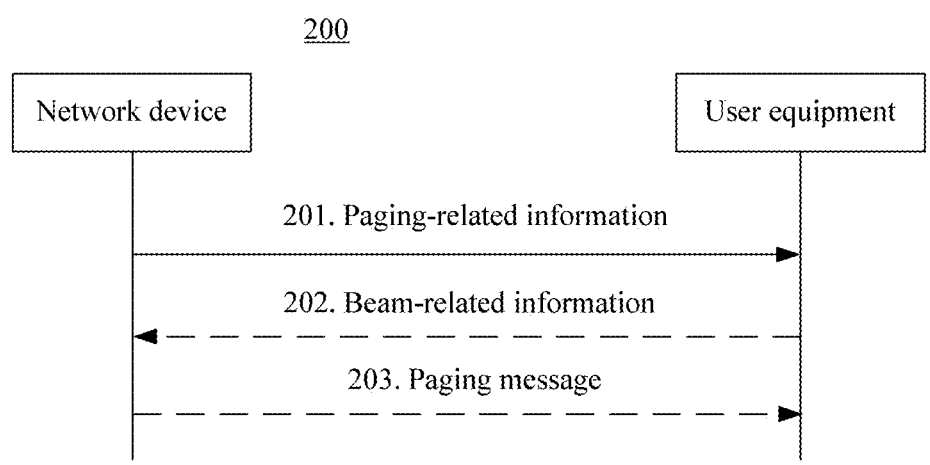
FIG. 2 is a schematic processing diagram of a paging method according to an embodiment of this application.

FIG. 2 shows a paging method according to an embodiment of this application. The method includes the following processes.

201. A network device sends paging-related information at a specified time, where the paging-related information is sent in a beam sweeping manner. Optionally, the paging-related information is sent periodically. Optionally, the specified time is a paging occasion. Optionally, the paging-related information is sent to UE.

The UE may receive the paging-related information.

The paging-related information may include any one of the following six information combinations:

1. Information indicating whether to instruct the user equipment to receive a paging message, and the paging message.

2. Information indicating whether to instruct the user equipment to receive a paging message, resource location information of the paging message, and the paging message.

3. Information indicating whether to instruct the user equipment to receive a paging message, a part of the paging message, and information for indicating whether another part of the paging message further exists.

4. Information indicating whether to instruct the user equipment to receive a paging message.

5. Information indicating whether to instruct the user equipment to receive a paging message, resource location information of a part of the paging message, and the part of the paging message.

6. Information indicating whether to instruct the user equipment to receive a paging message, and resource location information of the paging message.

The information indicating whether to instruct the user equipment to receive a paging message may be a P-RNTI, and certainly may be another identifier. The resource location information of the paging message may be a PDCCH, and further optionally, may be DCI in the PDCCH; or may be other information. The resource location information of the part of the paging message may be a PDCCH, and further optionally, may be DCI in the PDCCH; or may be other information.

The six combinations may further be classified into the following three types. For ease of description, the following provides descriptions by using an example in which the information indicating whether to instruct the user equipment to receive a paging message may be a paging radio network temporary identifier (P-RNTI for short), the resource location information of the paging message may be downlink control information (DCI for short), and the resource location information of the part of the paging message may be DCI, and the specified time is a PO.

In a manner of a first type, all content of the paging message is sent in the PO. There may be two manners: manner 1 and manner 2.

Figure 4:
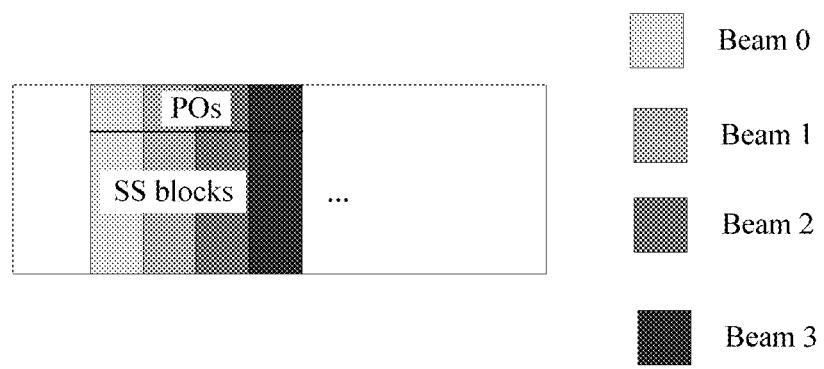
FIG. 4 is a schematic diagram of another frame structure according to an embodiment of this application.

Manner 1:

As shown in FIG. 4, in this case, the paging message and the P-RNTI are sent in the PO. The PDCCH may not be included. All the content of the paging message is placed in the PO for omnidirectional beam traversal.

In this case, the information sent in the PO may be carried on a PDSCH channel or another channel. This is not limited herein. The UE first detects whether the P-RNTI exists. If the P-RNTI exists, the UE further receives the paging message in the PO. If the P-RNTI does not exist, the UE does not need to listen for the paging message in the PO.

A placement relationship between the P-RNTI and the paging message may be of the following types:

1. The P-RNTI is used to scramble a channel that carries the paging message. The UE blindly detects the P-RNTI, and therefore determines that the PO includes the paging message.

2. The paging message and the P-RNTI are placed in a same OFDM (orthogonal frequency division multiplexing) symbol, and the paging message and the P-RNTI may be placed at a same frequency domain location or different frequency domain locations in the OFDM symbol. The frequency domain location may be predetermined by using a protocol. The UE first detects a time-frequency resource location of the P-RNTI. If detecting the P-RNTI, the UE determines that the PO includes the paging message, and further demodulates the content of the paging message from a time-frequency resource of the paging message.

3. The paging message and the P-RNTI are placed in a plurality of adjacent OFDM symbols, and the plurality of adjacent symbols may be sent by using one or more same beams. Likewise, the paging message and the P-RNTI are placed at a same time domain or frequency domain location or different time domain or frequency domain locations in the plurality of OFDM symbols. The time domain or frequency domain location may be predetermined by using a protocol. The UE first detects a time-frequency resource location of the P-RNTI. If detecting the P-RNTI, the UE determines that the PO includes the paging message, and further demodulates the content of the paging message from a time-frequency resource of the paging message.

This solution has an advantage that the network device does not need to perform beam sweeping again to send the paging message, and may not need to indicate a PDCCH resource. However, this solution may have a disadvantage that the paging message may occupy a relatively large time-frequency resource. Periodic beam sweeping sending should be performed in the PO, and therefore the paging message may not be placed in the PO.

Figure 5:
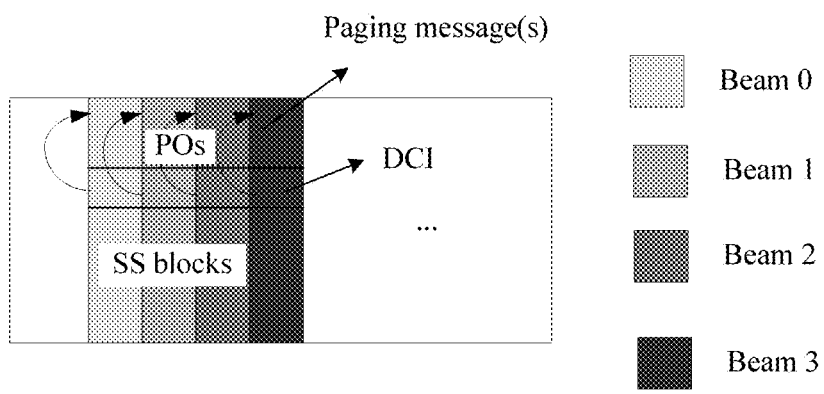
FIG. 5 a schematic diagram of another frame structure according to an embodiment of this application.

Manner 2:

As shown in FIG. 5, the P-RNTI, the PDCCH, and the paging message are sent in the PO.

The PDCCH (which may carry a control signal such as DCI) and the paging message (which may be carried on a PDSCH) may be scrambled by using the P-RNTI. All the content of the paging message is placed in the PO for omnidirectional beam traversal.

Optionally, the DCI in the PDCCH and the paging message may be subject to frequency division multiplexing, and are placed in a same OFDM symbol or a plurality of adjacent symbols in time domain. The plurality of adjacent symbols may be sent by using one or more same beams.

The UE first detects whether the P-RNTI exists. If the P-RNTI exists, the UE further receives the paging message in the PO based on a resource indication of the DCI. If the P-RNTI does not exist, the UE does not need to listen for the paging message in the PO.

An advantage and a disadvantage of this solution are similar to those of manner 1. The advantage is that the base station does not need to perform beam sweeping again to send the paging message. The disadvantage is that the paging message may occupy a relatively large time-frequency resource; or periodic beam sweeping sending should be performed in the PO, and therefore the paging message may not be placed in the PO.

In a manner of a second type, the part of the paging message is sent in the PO. There may be manners 3 to 5.

Figure 6:
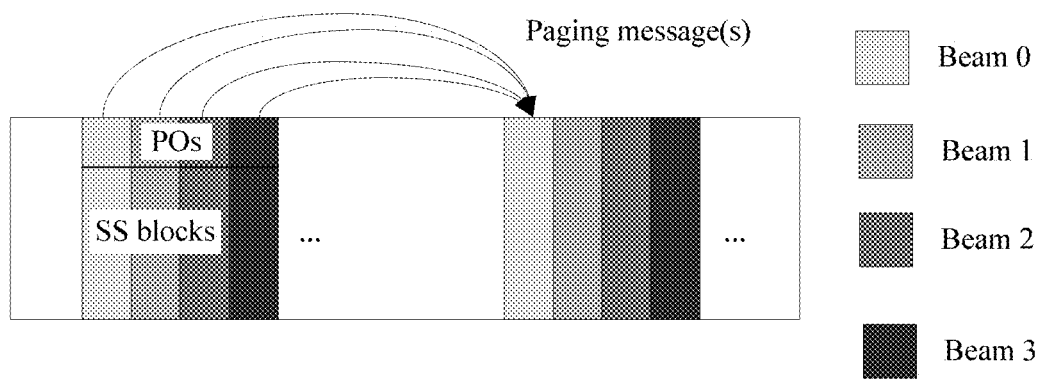
FIG. 6 is a schematic diagram of another frame structure according to an embodiment of this application.

Manner 3:

As shown in FIG. 6, the P-RNTI, the part of the paging message, and an indication indicating whether another part of the paging message further exists are sent in the PO. The part of the paging message is placed in the PO for omnidirectional beam traversal.

The indication indicating whether another part of the paging message further exists may be a 1-bit indication message. For example, if the indication is 0, it indicates that no another part of the paging message exists; or if the indication is 1, it indicates that another part of the paging message further exists. In this case, a channel that carries the part of the paging message and the indication indicating whether another part of the paging message further exists may be a PDSCH, a PDCCH, or another channel. The PDCCH may be in a newly-defined PDCCH format different from that in LTE.

A placement relationship between the P-RNTI, the part of the paging message, and the indication indicating whether another part of the paging message further exists may be of the following types:

1. The P-RNTI is used to scramble the channel that carries the part of the paging message and the indication indicating whether another part of the paging message further exists. The UE blindly detects the P-RNTI, and therefore determines that the PO includes the paging message.

2. The P-RNTI, the part of the paging message, and the indication indicating whether another part of the paging message further exists are placed in a same OFDM symbol (English: symbol), and the P-RNTI, the part of the paging message, and the indication indicating whether another part of the paging message further exists may be placed at a same frequency domain location or different frequency domain locations in the OFDM symbol. The frequency domain location may be predetermined by using a protocol. The UE first detects a time-frequency resource location of the P-RNTI. If detecting the P-RNTI, the UE determines that the PO includes the part of the paging message, and further demodulates, from a time-frequency resource of the part of the paging message and a time-frequency resource of the indication indicating whether another part of the paging message further exists, content of the part of the paging message and the indication indicating whether another part of the paging message further exists.

3. The P-RNTI, the part of the paging message, and the indication indicating whether another part of the paging message further exists are placed in a plurality of adjacent OFDM symbols, and the plurality of adjacent symbols may be sent by using one or more same beams. Likewise, the P-RNTI, the part of the paging message, and the indication whether another part of the paging message further exists are placed at a same time domain and/or frequency domain location or different time domain and/or frequency domain locations in the plurality of OFDM symbols. The time domain and/or frequency domain location may be predetermined by using a protocol. The UE first detects a time-frequency resource location of the P-RNTI. If detecting the P-RNTI, the UE determines that the PO includes the part of the paging message, and further demodulates, from a time-frequency resource of the part of the paging message and a time-frequency resource of the indication indicating whether another part of the paging message further exists, content of the part of the paging message and the indication indicating whether another part of the paging message further exists.

According to an introduction to the paging message in the 36.331 protocol in LTE, the paging message may include a paging record list, systemInfoModification, an ETWS, a CMAS, eab-ParamModification, redistributionIndication, and the like. Considering that the paging record list occupies relatively large space and is not an urgent message indication, the paging record list may not be placed in the PO.

If the UE first detects the P-RNTI in the PO, the UE demodulates, from the PO, the part of the paging message and the indication indicating whether another part of the paging message further exists. The UE performs a corresponding action based on an indication of the paging message (for example, receives an updated system message based on an indication of the ETWS). In addition, if "the indication indicating whether another part of the paging message further exists" indicates that another part of the paging message is included, the UE further needs to detect, at a corresponding resource location, another part of the paging message that is not placed in the PO. As shown in FIG. 4, the corresponding resource location may be a time-frequency resource location within a specific range relative to the PO burst set. For example, the channel that carries the another part of the paging message and that is scrambled by using the P-RNTI is detected in an $m^{th}$ subframe/slot after the PO, where m may be a fixed value or may be configurable, and the channel may be a PDSCH. Alternatively, a PDCCH that is scrambled by using the P-RNTI is first detected in an $m^{th}$ subframe/slot after the PO, and then the another part of the paging message is detected at the corresponding resource location based on a resource indication of the demodulated PDCCH. This is not limited herein.

A manner of sending the another part of the paging message that is not placed in the PO may be but is not limited to any one of the following manners:

1. The another part of the paging message that is not placed in the PO is sent through omnidirectional beam sweeping, and the UE blindly detects the another part of the paging message sent through omnidirectional beam sweeping. This solution cannot reduce beam sweeping overheads.

2. The network device sends, based on beam information reported by the UE, the another part of the paging message that is not placed in the PO. The beam information is used to indicate related information of a beam that can be used by the network device to send a paging message. The related information for indicating the beam that can be used by the network device to send a paging message is any one or more of the following information: a beam ID, an OFDM symbol sequence number, an antenna port number, a slot number, a subframe number, a radio frame number, and a preamble sequence.

Figure 3:
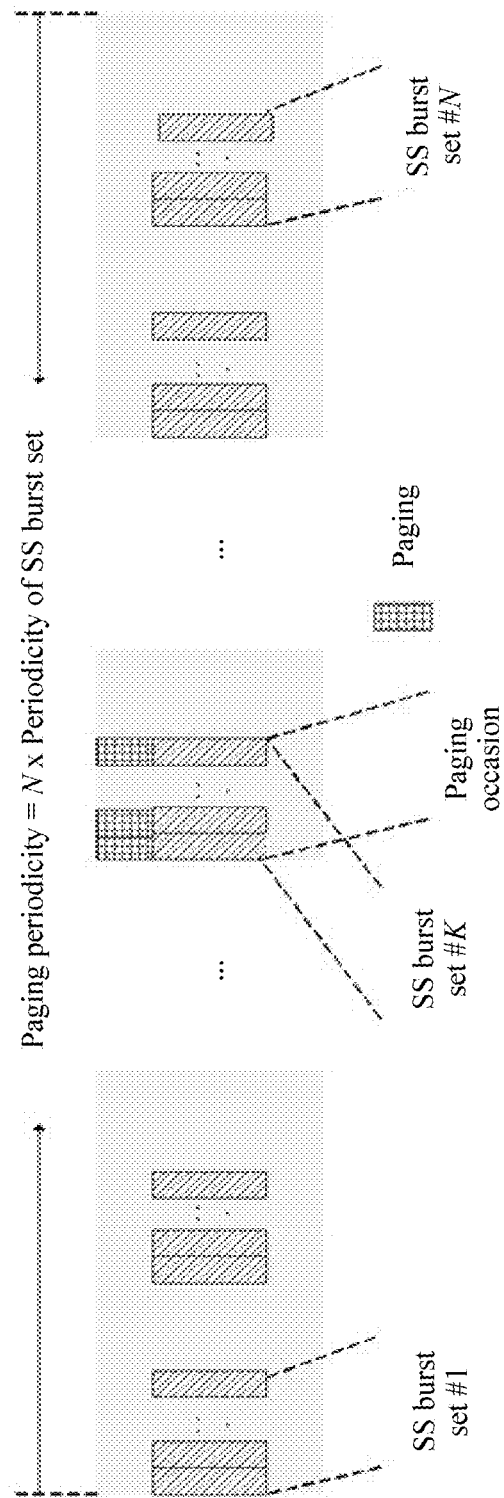
FIG. 3 is a schematic diagram of a frame structure according to an embodiment of this application.

In a radio frame (which may be used in a high frequency) shown in FIG. 3, a synchronization signal block (SS block) is usually repeatedly sent, and each SS block is sent by using a different beam, to cover an entire cell. Each SS block may include one OFDM symbol or at least two OFDM symbols. Each SS block carries a synchronization signal such as a PSS or an SSS, and may further carry system information such as a MIB. Each OFDM symbol in one SS block may be sent by using one or more same beams. A plurality of SS blocks that are continuously sent in time domain may be referred to as one synchronization signal block burst SS block burst. Different SS blocks in the SS block burst are sent by using different beams. Coverage of an entire cell can be completed through beam traversal for one or more SS block bursts. The one or more SS block bursts may be referred to as one SS block burst set. An SS block burst set #1 in FIG. 3 is used as an example. There are N SS block bursts in the SS block burst set #1. The N SS block bursts may be continuous or discontinuous in time domain. The N SS block bursts include same information. When the N SS block bursts are sent by using different beams, coverage in different directions is achieved.

Generally, each UE has own paging periodicity, and the PO may be the same time as one or more SS burst block sets in the paging periodicity. FIG. 3 is used as an example. A paging periodicity of user equipment and a PO are used as an example. The PO may be the same time as an SS burst block set #K. A transmission resource block (a resource block filled with square lines) corresponding to the PO and may be placed together with an SS block (a resource block filled with oblique lines), and sent in a frequency division manner or in a time division manner by using a same beam as the SS block.

In this case, the paging periodicity is an integer multiple of, for example, N times, a period of the SS block burst set, and N is a positive integer. The SS block burst set may have a number. The number of the SS block burst set may be corresponding to a radio frame number/subframe number/slot number.

Each UE calculates own paging periodicity, and performs detection in a corresponding PO based on own paging periodicity. Because the UE may also have a plurality of beams, the UE does not know a beam used to detect the PO. A user in a connected mode can perform synchronization beam sweeping detection at any time to maintain an available TX/RX beam pair. Reporting is performed when a detected optimal TX beam changes, and a user in an inactive mode (for example, a user that supports grant-free) can also maintain an available TX/RX beam pair in an uplink grant-free reporting manner. However, a user in an idle mode may be unable to maintain an available TX/RX beam pair. In addition, frequent beam sweeping and reporting also increase power consumption and signaling overheads of the UE. It is assumed that UE has N beams, and the period of the SS block burst set is T. In this case, before listening on own PO, the UE needs to start detecting synchronization beams of N SS block burst sets before N*T (if the UE is in an idle/inactive mode, the UE wakes up and performs detection in the N SS block burst sets; or if the UE is in a connected mode, the UE directly performs detection in the N SS block burst sets). The UE performs detection in each SS block burst set by using different receive beams, and therefore can obtain, before the PO, an available receive RX beam (which may be optimal) for receiving a signal, and use the available receive beam to detect the PO. By detecting the synchronization beams of the N SS block burst sets, the UE can also obtain a downlink transmit TX beam that meets a signal quality threshold. Because omnidirectional beam sweeping needs to be performed in the PO, when detecting the PO, the UE may perform detection only in a slot of the downlink transmit beam that meets the signal quality threshold, or may perform detection in slots of all scanned beams of the PO.

If the UE has obtained an available TX/RX beam pair before listening on own PO, the available TX/RX beam pair may include an optimal TX/RX beam pair. For example, if the UE detects, by using an RX beam, that the PO includes the P-RNTI, and "the indication indicating whether another part of the paging message further exists" indicates that another part of the paging message is further included, the UE reports information about a detected available TX beam. The TX beam may be a beam used by the network device to send the paging-related information to the UE. The UE performs reporting in a direction of an obtained available RX beam, and the RX beam may be a beam used by the UE for reception. Herein, UEs in different modes may perform reporting in different manners. For example, UE in a connected mode may perform reporting by using uplink control signaling/RRC (radio resource control) signaling or in another manner; if supporting grant-free, a user in a connected/inactive mode may perform reporting through uplink grant-free; and a user in an idle mode may perform reporting by using an RACH (random access channel) resource. A reporting manner is not limited. The reported beam information may be at least one of a beam ID (identifier), an OFDM symbol sequence number symbol index, an antenna port number, a slot number, a subframe number, a radio frame number, and a preamble sequence (which may be a preamble during random access). In this case, the base station knows beams on which a user receives the P-RNTI, and sends, at a corresponding resource location by using these beams, the another part of the paging message to the user that performs reporting, to reduce overheads of omni-directional beam sweeping. It should be noted that duration between the PO burst set and the resource location at which the network device sends a part of the paging message other than the part of the paging message that is sent in the PO (which may be briefly referred to as another part of the paging message) needs to be greater than or equal to a latency in reporting the beam information by the UE.

A manner in which the user equipment (which may be in an idle mode) reports the beam information by using a random access channel (RACH) resource may be but not limited to any one of the following feedback manners:

In a first manner, as described above, the UE directly sends the beam information on the RACH resource, and the base station performs blind detection on the RACH resource. For example, a block of time-frequency resource used by the UE to report the beam information may be obtained by dividing the RACH resource. In this case, the UE directly sends the beam information on the RACH resource. If the network device receives the beam information, the network device considers that the UE that aligns with the downlink beam has received the P-RNTI, and sends the paging message to the UE by using the downlink beam.

In a second manner, a group of preambles may be defined in a protocol. The preamble is used by the UE to report the beam information, but is not used to initiate random access. In a specific implementation, the UE selects a preamble, and sends the preamble on the RACH resource; and the base station performs blind detection on the RACH resource in an omnidirectional beam sweeping manner. If detecting, on a receive beam of the base station, the preamble sent by the UE, the base station considers that the user that aligns with the receive beam has received the P-RNTI. In this case, the base station does not reply to the UE with a random access response (RAR), and the base station uses a direction of the receive beam as a direction of a transmit beam, to send the another part of the paging message to the user.

In a third manner, a frequency band used by the UE to report the beam information is obtained by dividing the RACH resource. The UE sends a preamble at the frequency band, and the base station performs blind detection on the RACH resource in an omnidirectional beam sweeping manner. If receiving, on a receive beam of the base station and at the dedicated frequency band, the preamble sent by the UE, the base station considers that the user that aligns with the receive beam has received the P-RNTI. In this case, the base station does not reply to the UE with a random access response (RAR: random access response), and the base station uses a direction of the receive beam as a direction of a transmit beam, to send the another part of the paging message to the user.

Manner 4:

Likewise, as shown in FIG. 6, the P-RNTI is sent in the PO. Omnidirectional beam traversal is performed in the PO.

If the UE detects the P-RNTI in the PO, the UE detects all the paging message at a corresponding resource location, and subsequent operations may be the same as those in the solution in manner 2: The corresponding resource location may be a fixed time-frequency resource location relative to the PO burst set. For example, a channel that carries the paging message and that is scrambled by using the P-RNTI is detected in an $m^{th}$ (m may be a fixed value or may be configurable) subframe/slot after the PO, where the channel may be a PDSCH. Alternatively, a PDCCH that is scrambled by using the P-RNTI is first detected in an $m^{th}$ subframe/slot after the PO, and then the paging message is detected at the corresponding resource location based on a resource indication of the demodulated PDCCH. This is not limited herein.

A manner of sending another paging message that is not placed in the PO and a manner in which the user equipment (which may be in an idle mode) reports beam information by using an RACH resource may be described as above, and details are not described again.

Manner 5:

Likewise, as shown in FIG. 6, the P-RNTI, the part of the paging message, and information for indicating a resource location of the another part of the paging message are sent in the PO.

The information for indicating the resource location of the another part of the paging message may be a DCI control signal, and DCI may be carried by using a PDCCH. In this manner, the part of the paging message is placed in the PO for omnidirectional beam traversal.

In this case, not all parts of the paging message but the part of the paging message is included in the PO. The part of the paging message may be carried by using a PDSCH, a PDCCH (in a newly-defined PDCCH format), or another channel. The P-RNTI, the part of the paging message, and the information for indicating the resource location of the another part of the paging message may be described in a manner the same as manner 1.

The UE first detects whether the P-RNTI exists in the PO, and then detects the part of the paging message (if existent) in the PO, and detects, at a corresponding resource location based on resource indication information of the DCI control signal, another part of the paging message (which may include a paging record list) that is not placed in the PO.

A manner of sending the another part of the paging message that is not placed in the PO and a manner in which the user equipment (which may be in an idle mode) reports beam information by using an RACH resource may be described as above, and details are not described again.

In the third type, the paging message is not sent in the PO.

Manner 6:

Likewise, as shown in FIG. 6, the P-RNTI and the information for indicating a resource location of the paging message are sent in the PO. The paging message is not included in the PO.

The information for indicating the resource location of the paging message may be a DCI control signal, and DCI may be carried by using a PDCCH.

The UE first detects the P-RNTI in the PO, and then detects the information for indicating the resource location of the paging message, such as DCI, and detects, at the corresponding resource location based on resource indication information of the DCI control signal, paging message (which may include a paging record list) that is not placed in the PO.

A manner of sending the paging message and a manner in which the user equipment (which may be in an idle mode) reports beam information by using an RACH resource may be described as above, and details are not described again.

User equipments may report beam information, so that the network device knows downlink beams of the network device that are separately aligned with the user equipments that receive P-RNTIs, and the network device sends, at corresponding resource locations by using the downlink beams, paging messages to the user equipments that perform reporting, to reduce overheads in sending paging message through omnidirectional beam sweeping.

Mutual reference may be made between content described in the foregoing manners. For brevity of this application, details are not described again.

The reporting, by the user equipment, the beam information to the network device may be process 202 in FIG. 2, and the sending, by the network device, the paging message based on the beam information reported by the user equipment may be process 203 in FIG. 2. Process 202 and process 203 may be optional processing.

Figure 7:
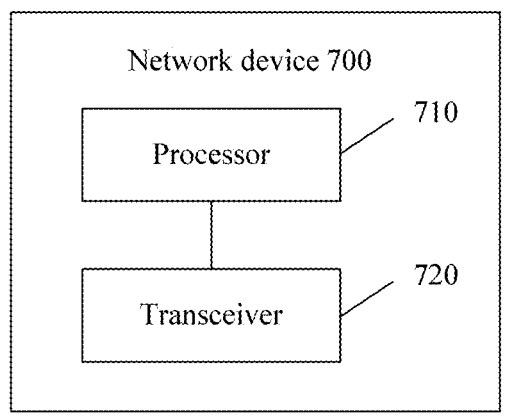
FIG. 7 is a schematic block diagram of a network device according to an embodiment of this application.

FIG. 7 is a schematic block diagram of a network device according to an embodiment of this application. As shown in FIG. 7, the apparatus 700 includes a processor 710 and a transceiver 720. The transceiver 720 may alternatively be implemented by a transceiver unit or a transceiver circuit, and the processor 710 may be implemented by one or more units or circuits. The transceiver may be instructed by the processor to complete an action of the transceiver.

It should be understood that the apparatus 700 may be corresponding to the network device in the method embodiments, and may have any function of the network device in the method. The following uses only some functions as an example for description. However, this embodiment is not limited thereto.

The transceiver is configured to send paging-related information at a specified time, where the paging-related information is sent in a beam sweeping manner.

Optionally, the paging-related information includes any one of the following information combinations:

information indicating whether to instruct the user equipment to receive a paging message, and the paging message;

information indicating whether to instruct the user equipment to receive a paging message, resource location information of the paging message, and the paging message;

information indicating whether to instruct the user equipment to receive a paging message, a part of the paging message, and information for indicating whether another part of the paging message further exists;

information indicating whether to instruct the user equipment to receive a paging message;

information indicating whether to instruct the user equipment to receive a paging message, resource location information of another part of the paging message, and a part of the paging message; and information indicating whether to instruct the user equipment to receive a paging message, and resource location information of the paging message.

Optionally, the information indicating whether to instruct the user equipment to receive a paging message is a paging radio network temporary identifier (P-RNTI), and/or the resource location information of the paging message is downlink control information (DCI), and/or the resource location information of the another part of the paging message is DCI, and/or the specified time is a paging occasion (PO).

Optionally, the transceiver is further configured to receive beam information sent by the user equipment, where the beam information is used to indicate related information of a beam that can be used by the network device to send a paging message; the processor is configured to determine, based on the beam information, a beam used to send another part of the paging message or the paging message; and the transceiver is further configured to send the another part of the paging message or the paging message based on the beam determined by the processor.

Optionally, the related information of the beam that can be used by the network device to send a paging message is any one or more of the following information: a beam ID, an OFDM symbol sequence number, an antenna port number, a slot number, a subframe number, and a radio frame number. Optionally, the apparatus is applied to a high-frequency scenario.

Figure 8:
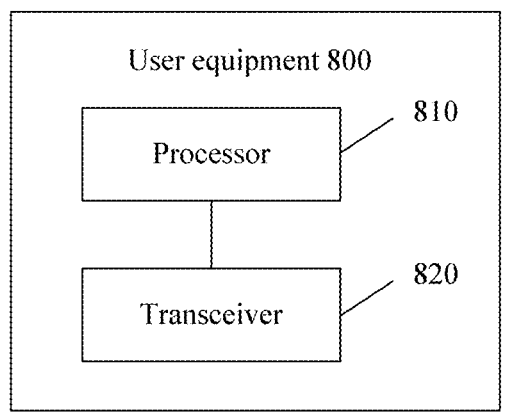
FIG. 8 is a schematic block diagram of a user equipment according to an embodiment of this application.

FIG. 8 is a schematic block diagram of a user equipment according to an embodiment of this application. As shown in FIG. 8, the apparatus 800 includes a processor 810 and a transceiver 820. The transceiver 820 may alternatively be implemented by a transceiver unit or a transceiver circuit, and the processor 810 may be implemented by one or more units or circuits. The transceiver may be instructed by the processor to complete an action of the transceiver.

It should be understood that the apparatus 800 may be corresponding to the user equipment in the method embodiments, and may have any function of the user equipment in the method. The following uses only some functions as an example for description. However, this embodiment is not limited thereto.

The transceiver is configured to receive paging-related information.

The transceiver is further configured to obtain a paging message based on the paging-related information.

Optionally, that the transceiver is further configured to obtain a paging message based on the paging-related information is specifically:

the paging-related information includes information indicating whether to instruct the user equipment to receive a paging message, and the paging message; and the transceiver is configured to detect the information indicating whether to instruct the user equipment to receive a paging message, and further detects the paging message in the paging-related information;

the paging-related information includes information indicating whether to instruct the user equipment to receive a paging message, resource location information of the paging message, and the paging message; and the transceiver is configured to detect the information indicating whether to instruct the user equipment to receive a paging message, and further detects the paging message based on the resource location information of the paging message;

the paging-related information includes information indicating whether to instruct the user equipment to receive a paging message, a part of the paging message, and information for indicating whether another part of the paging message further exists; and the transceiver is configured to detect the information indicating whether to instruct the user equipment to receive a paging message, further detects the part of the paging message, and detects the another part of the paging message based on the information for indicating whether another part of the paging message further exists;

the paging-related information includes information indicating whether to instruct the user equipment to receive a paging message; and the transceiver is configured to detect the information indicating whether to instruct the user equipment to receive a paging message, and then detects the paging message;

the paging-related information includes information indicating whether to instruct the user equipment to receive a paging message, resource location information of another part of the paging message, and a part of the paging message; and the transceiver is configured to detect the information indicating whether to instruct the user equipment to receive a paging message, and then detects the paging message in the paging-related information and detects the another part of the paging message based on the resource location information of the another part of the paging message; and the paging-related information includes information indicating whether to instruct the user equipment to receive a paging message, and resource location information of the paging message; and the transceiver is configured to detect the information indicating whether to instruct the user equipment to receive a paging message, and then detects resource location information of another part of the paging message and detects the another part of the paging message based on the resource location information of the another part of the paging message.

Optionally, the transceiver is configured to send beam information, where the beam information is used to indicate related information of a beam that can be used by a network device to send a paging message; and the transceiver is configured to receive another part of the paging message or the paging message that is sent by the network device based on the beam information.

Optionally, the transceiver is configured to send the beam information by using a random access channel resource.

Optionally, the processor is configured to send a preamble sequence by using a random access channel resource.

Optionally, the apparatus is applied to a high-frequency scenario.

Optionally, the apparatus 700 and the apparatus 800 each may further include a memory. The memory may store program code and other storage content. The processor invokes the program code and the other storage content that are stored in the memory, to implement a corresponding function of the apparatus 700 or the apparatus 800.

An implementation of this application further includes a communications system, including the network device in the foregoing network device embodiment and the user equipment in the foregoing user equipment embodiment.

In the descriptions of the foregoing manner 3, the description "the channel that carries the paging message and that is scrambled by using the P-RNTI is detected in an mth subframe/slot (English: slot) after the PO, where m may be a fixed value or may be configurable, and the channel may be a PDSCH. Alternatively, a PDCCH that is scrambled by using the P-RNTI is first detected in an mth subframe/slot after the PO, and then the paging message is detected at the corresponding resource location based on a resource indication of the demodulated PDCCH. This is not limited herein" can be more clearly described as follows: The channel that carries the paging message and that is scrambled by using the P-RNTI is detected in n subframes/slots starting from the mth subframe/slot after the PO, where both m and n are positive integers, and m and n may be fixed values or may be configurable; and the channel may be a PDSCH. Alternatively, the PDCCH that is scrambled by using the P-RNTI is first detected in n subframes/slots starting from the mth subframe/slot after the PO, and then the paging message is detected at the corresponding resource location based on the resource indication of the demodulated PDCCH. This is not limited herein.

In the descriptions of the foregoing manner 4, the description "a channel that carries the paging message and that is scrambled by using the P-RNTI is detected in an mth (m may be a fixed value or may be configurable) subframe/slot after the PO, where the channel may be a PDSCH. Alternatively, a PDCCH that is scrambled by using the P-RNTI is first detected in an mth subframe/slot after the PO, and then the paging message is detected at the corresponding resource location based on a resource indication of the demodulated PDCCH. This is not limited herein" can be more clearly described as follows: The channel that carries the paging message and that is scrambled by using the P-RNTI is detected in n subframes/slots starting from the mth subframe/slot after the PO (m and n are positive integers, and m and n may be fixed values or may be configurable), where the channel may be a PDSCH. Alternatively, the PDCCH that is scrambled by using the P-RNTI is first detected in n subframes/slots starting from the mth subframe/slot after the PO, and then the paging message is detected at the corresponding resource location based on the resource indication of the demodulated PDCCH. This is not limited herein.

In manner 4, the following descriptions are added, but no addition or modification is made to the original solution:

Alternatively, the foregoing embodiments provide descriptions by using the example in which the information for indicating whether the user equipment is to receive a paging message is the P-RNTI. Therefore, in general understanding, the description may also be replaced with a description that the information for indicating whether the user equipment is to receive a paging message is sent in the PO. The information for indicating whether the user equipment is to receive a paging message may be, for example, 1-bit indication information.

If the UE detects, in the PO, the information for indicating whether the user equipment is to receive a paging message, the UE detects the paging message at the corresponding resource location. Subsequent operations may be the same as those in the solution in manner 2: The corresponding resource location may be a fixed time-frequency resource location relative to the PO (because a plurality of types of descriptions may be used for a same physical quantity in the industry, if the PO herein is understood by using a concept principle similar to that of the SS block burst set in the industry, the PO herein may also be referred to as a PO burst set, and the PO burst set includes one or more PO bursts). For example, the channel that carries the paging message and that is scrambled by using the P-RNTI is detected in the n subframes/slots starting from the mth subframe/slot after the PO (m and n are positive integers, and m and n may be fixed values or may be configurable), where the P-RNTI may be a fixed hexadecimal number FFFE or another fixed value, or may be an unfixed value; and the channel may be a PDSCH. Alternatively, the PDCCH that is scrambled by using the P-RNTI is first detected in the n subframes/slots starting from the mth subframe/slot after the PO, where the P-RNTI may be a fixed hexadecimal number FFFE or another fixed value, or may be an unfixed value; and then the paging message is detected at the corresponding resource location based on the resource indication of the demodulated PDCCH. This is not limited herein.

Figure 9:
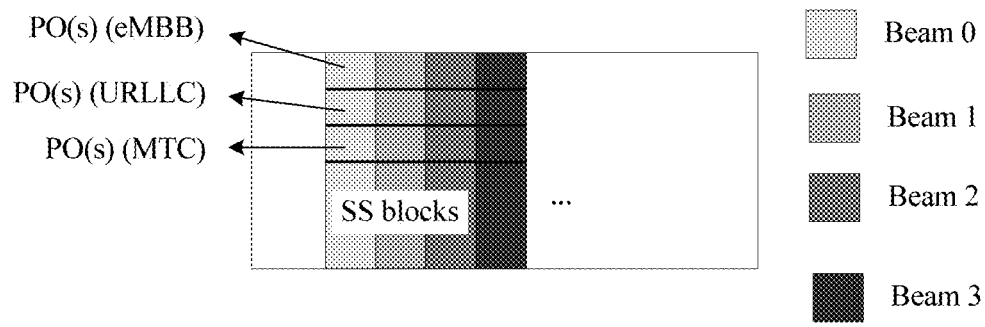
FIG. 9 is a schematic diagram of time-frequency resources corresponding to paging-related information of different services according to an embodiment of the present invention.

In the future, a network slice architecture may need to be supported, to be specific, different service types need to be separately controlled. For paging, there may be a plurality of types of paging-related information, and paging control is separately performed on UEs of different service types (for example, enhanced mobile broadband (eMBB for short), ultra-reliable and low latency communications (URLLC for short), machine type communication (MTC for short). For example, there are eMBB paging-related information, URLLC paging-related information, and MTC paging-related information. For example, different types of paging-related information may include different P-RNTI values. Further, different PO resources may be configured for the UEs of different service types. For example, there are time-frequency resources corresponding to the plurality of types of paging-related information, such as a time-frequency resource corresponding to the eMBB paging-related information, a time-frequency resource corresponding to the URLLC paging-related information, and a time-frequency resource corresponding to the MTC paging-related information. The time-frequency resources corresponding to the plurality of types of paging-related information are subject to time division multiplexing or frequency division multiplexing. FIG. 9 shows a frequency division relationship. For example, as shown in FIG. 9, a PO resource may be divided into time-frequency resources corresponding to paging-related information of a plurality of different services, to separately page UEs of different service types. As shown in FIG. 9, PO(s) (eMBB) may represent a time-frequency resource corresponding to eMBB paging-related information. Because a plurality of types of descriptions may be used for a same physical quantity in the industry, "s" is added after "PO". It may be considered that POs are described in a similar understanding manner to the SS block burst set. Therefore, the POs may be considered as one or more PO bursts or one or more PO burst sets. PO(s) (URLLC) represents a PO corresponding to an URLLC service, and PO(s) (MTC) represents a PO corresponding to an MTC service. The time-frequency resources corresponding to the paging-related information of the plurality of different services may be in a time division multiplexing relationship or a frequency division multiplexing relationship (as shown in FIG. 9) with SS blocks (synchronization signal blocks). A beam for sending the paging-related information in a beam sweeping manner may be the same as a beam for sending the SS block. If the time-frequency resources corresponding to the paging-related information and the SS blocks are not subject to time division multiplexing or frequency division multiplexing, beam sweeping for sending the paging-related information may be another round of beam sweeping different from beam sweeping for sending a synchronization signal. Message content included in paging-related information of various service types and paging message sending manners of the various service types, and detection operations performed by UE can be shown in the sending manners 1 to 6 mentioned in the foregoing embodiments, and details are not described again.

Figure 10:
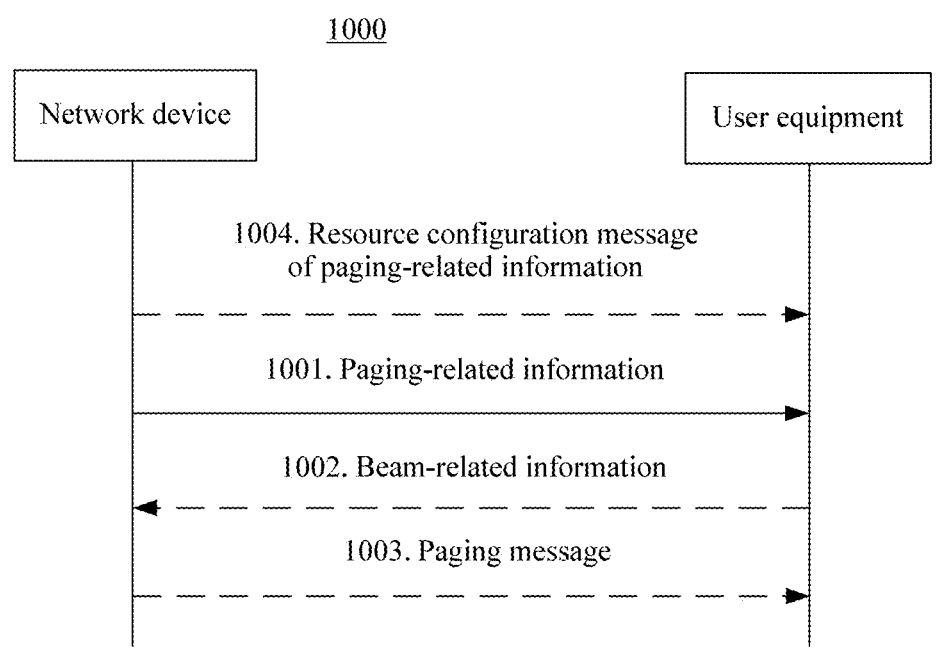
FIG. 10 is a schematic flowchart of another method according to an embodiment of the present invention

Various service types unnecessarily coexist in a network, for example, in a time period, there is no UE of a URLLC service in the network. In this case, there may be no PO(s) (URLLC), and in the network, a resource of PO(s) (URLLC) may be used as a PO of a service of another type, or the resource may be used for a service other than a paging service. Therefore, in the network, the time-frequency resource of the paging-related information may be dynamically/semi-statically configured. The configuration may be broadcast to UEs in a cell by using, for example, a system message. For example, a resource configuration message (the message may have another name) of the paging-related information may be used. As shown in FIG. 10, process 1001 to process 1003 in FIG. 10 may be similar to process 201 to process 203 in FIG. 2. In the processing diagram, process 1004 is performed before process 1001, but a sequence during implementation may not be limited to that in the diagram. In process 1004, the network device sends a resource configuration message of the paging-related information to the user equipment. The resource configuration message of the paging-related information is used to indicate information about a time-frequency resource corresponding to at least one type of paging-related information. For example, two fields are used, a first field is used to indicate a type of paging-related information, and a second field is used to indicate a time-frequency resource of the paging-related information of the type indicated in the first field. A specific indication method may be an index manner or another manner. Certainly, another manner may be used for sending.

Correspondingly, optionally, the transceiver in the foregoing network device embodiment is further configured to send the paging-related information at the specified time and a specified frequency band, where the specified time and the specified frequency band each are one of time-frequency resources corresponding to a plurality of types of paging-related information. The plurality of types of paging-related information and the time-frequency resources corresponding to the plurality of types of paging-related information are not described again. Optionally, the transceiver in the network device embodiment is further configured to send a resource configuration message of the paging-related information, where the resource configuration message of the paging-related information is used to indicate information about a time-frequency resource corresponding to at least one type of paging-related information.

Correspondingly, optionally, the transceiver in the foregoing user equipment embodiment is further configured to receive the paging-related information at a specific time, and is further configured to receive the paging-related information at the specific time and a specified frequency band, where the specified time and the specified frequency band each are one of time-frequency resources corresponding to a plurality of types of paging-related information. The plurality of types of paging-related information and the time-frequency resources corresponding to the plurality of types of paging-related information are not described again. Optionally, the transceiver in the user equipment embodiment is further configured to receive a resource configuration message of the paging-related information, where the resource configuration message of the paging-related information is used to indicate information about a time-frequency resource corresponding to at least one type of paging-related information.

For the foregoing method, apparatus, and system embodiments, to make descriptions clear, "information indicating whether to instruct the user equipment to receive a paging message" is modified to "information for instructing the user equipment to receive a paging message".

The apparatus in the implementations of this application may be a field-programmable gate array (FPGA), may be an application-specific integrated circuit (ASIC), a system on chip (SoC), a central processing unit (CPU), a network processor (NP), a digital signal processor (DSP), a micro control unit (MCU), a programmable logic device (PLD), or another integrated chip.

A person of ordinary skill in the art may be aware that, in combination with the examples described in the embodiments disclosed in this specification, units and algorithm processes can be implemented by electronic hardware or a combination of computer software and electronic hardware. Whether the functions are performed in a hardware or software manner depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again. For ease of brevity, mutual reference may be made between the embodiments, and details are not described.

In the several embodiments provided in this application, it should be understood that the disclosed system, apparatus, and method may be implemented in other manners. For example, the described apparatus embodiments are merely examples. For example, the unit division is merely logical function division and may be another division manner during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, to be specific, may be located in one position, or may be distributed on a plurality of network units. Some or all of the units may be selected based on actual requirements to achieve the objectives of the solutions in the embodiments.

In addition, the functional units in the embodiments of the present invention may be integrated into one processing unit, or each of the units may exist alone physically, or two or more units may be integrated into one unit.

When the functions are implemented in the form of a software functional unit and sold or used as an independent product, the functions may be stored in a computer-readable storage medium. Based on such an understanding, the technical solutions in the present invention essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the processes of the method described in the embodiments of the present invention. The foregoing storage medium includes any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method, comprising:
 sending, by a network device, paging-related information of a paging message through a physical downlink control channel (PDCCH), the paging message comprising a first part and a second part, wherein the paging-related information comprises following information without comprising the second part of the paging message:
 indication information for a user equipment to receive the paging message, the first part of the paging message comprising a system message update indication (systemInfoModification), and resource location information for locating the second part of the paging message; and signaling, by the network device, that the paging message comprises the second part.

2. The method according to claim 1, wherein the indication information for the user equipment to receive the paging message is a paging radio network temporary identifier (P-RNTI).

3. The method according to claim 1, wherein the paging-related information comprises an indication indicating whether the second part of the paging message exists.

4. The method according to claim 3, wherein the indication indicating whether the second part of the paging message exists is a 1-bit indication.

5. A method, comprising:
receiving, by a user equipment, paging-related information of a paging message from a network device through a physical downlink control channel (PDCCH), the paging message comprising a first part and a second part, with the paging-related information not including the second part of the paging message;
obtaining, by the user equipment, the paging-related information, wherein the paging-related information comprises:
indication information for the user equipment to receive the paging message, the first part of the paging message comprising a system message update indication (systemInfoModification), and resource location information for locating the second part of the paging message; and
receiving, by the user equipment, signaling indicating that the paging message comprises the second part.

6. The method according to claim 5, further comprising:
obtaining, by the user equipment, the second part of the paging message according to the signaling and the resource location information.

7. The method according to claim 5, wherein the indication information for the user equipment to receive the paging message is a paging radio network temporary identifier (P-RNTI).

8. The method according to claim 5, wherein the paging-related information comprises an indication indicating whether the second part of the paging message exists.

9. The method according to claim 8, wherein the indication indicating whether the second part of the paging message exists is a 1-bit indication.

10. A communication device, comprising a transceiver:
the transceiver is configured to:
send paging-related information of a paging message through a physical downlink control channel (PDCCH), the paging message comprising a first part and a second part, wherein the paging-related information comprises following information without comprising the second part of the paging message:
indication information for a user equipment to receive the paging message, the first part of the paging message comprising a system message update indication (systemInfoModification), and resource location information for locating the second part of the paging message; and
signal that the paging message comprises the second part.

11. The communication device according to claim 10, wherein
the indication information for the user equipment to receive the paging message is a paging radio network temporary identifier (P-RNTI).

12. The communication device according to claim 10, wherein the paging-related information comprises an indication indicating whether the second part of the paging message exists.

13. A communication device, comprising a processor and a transceiver,
wherein the transceiver is configured to receive paging-related information of a paging message from a network device through a physical downlink control channel (PDCCH), the paging message comprising a first part and a second part, with the paging-related information not including the second part of the paging message; and
wherein the processor is configured to obtain the paging-related information;
wherein the paging-related information comprises indication information for the communication device to receive the paging message, the first part of the paging message comprising a system message update indication (systemInfoModification), and resource location information for locating the second part of the paging message; and
wherein the transceiver is further configured to receive signaling indicating that the paging message comprises the second part.

14. The communication device according to claim 13, wherein
the indication information for the communications device to receive the paging message is a paging radio network temporary identifier (P-RNTI).

15. The communication device according to claim 13, wherein the paging-related information comprises an indication indicating whether the second part of the paging message exists.

* * * * *